United States Patent
Thompson et al.

(10) Patent No.: US 11,248,735 B1
(45) Date of Patent: Feb. 15, 2022

(54) IN-LINE THERMAL BREAK

(71) Applicant: Mustang Sampling, LLC, Ravenswood, WV (US)

(72) Inventors: Kenneth O Thompson, Ravenswood, WV (US); Kevin Warner, The Woodlands, TX (US); William C. Paluch, Jersey Village, TX (US)

(73) Assignee: Mustang Sampling, LLC, Ravenswood, WV (US)

( * ) Notice: Subject to any disclaimer, the term of this patent is extended or adjusted under 35 U.S.C. 154(b) by 0 days.

(21) Appl. No.: 17/329,658

(22) Filed: May 25, 2021

(51) Int. Cl.
*F16L 59/14* (2006.01)
*F16L 59/06* (2006.01)

(52) U.S. Cl.
CPC .............. *F16L 59/14* (2013.01); *F16L 59/06* (2013.01)

(58) Field of Classification Search
CPC ...... G01N 1/10; G01N 1/2202; G01N 1/2226; G01N 2001/105; G01N 2001/2238; F16L 59/06; F16L 59/14; F16L 59/182
USPC .................................................. 138/149, 44
See application file for complete search history.

(56) References Cited

U.S. PATENT DOCUMENTS

| | | | | |
|---|---|---|---|---|
| 220,084 A | * | 9/1879 | Milford | F16K 15/04 137/533.11 |
| 235,846 A | * | 12/1880 | Ashcraft | F16L 33/01 138/109 |
| 2,129,680 A | * | 9/1938 | Durant | F16L 59/14 249/90 |
| 2,790,842 A | | 4/1957 | Nicholas | |
| 2,952,387 A | | 9/1960 | Fowler et al. | |
| 2,958,512 A | * | 11/1960 | Humphrey | E21B 17/16 403/42 |
| 3,101,863 A | | 8/1963 | Jackson | |
| 3,492,029 A | * | 1/1970 | French | F16L 59/182 285/47 |
| 4,034,611 A | | 7/1977 | Horling | |
| 4,487,080 A | | 12/1984 | Leaseburge et al. | |
| 4,560,012 A | * | 12/1985 | McNeely, Jr. | E21B 17/16 138/149 |
| 5,065,139 A | | 11/1991 | Shefsky | |
| 5,824,919 A | | 10/1998 | Hansen | |
| 6,750,730 B2 | | 6/2004 | Heisen | |
| 7,484,404 B2 | | 2/2009 | Thompson et al. | |
| D790,053 S | | 6/2017 | Querrey et al. | |
| D822,180 S | | 7/2018 | Rolston | |
| 10,976,222 B2 | * | 4/2021 | Rolston | G01N 1/2202 |
| 2003/0116091 A1 | | 6/2003 | Grant et al. | |
| 2003/0233890 A1 | | 12/2003 | Mayeaux | |
| 2006/0051252 A1 | | 3/2006 | Yuan et al. | |
| 2008/0282814 A1 | | 11/2008 | Coleman et al. | |
| 2009/0151427 A1 | | 6/2009 | Thompson et al. | |
| 2011/0006968 A1 | | 1/2011 | Morrow | |

(Continued)

FOREIGN PATENT DOCUMENTS

WO   DM214337   3/2021

OTHER PUBLICATIONS

2016-NGStech, Natural Gas Sampling Technology Conference, Article and Photo, Jan. 20-21, 2016.

*Primary Examiner* — Patrick F Brinson

(57) ABSTRACT

A multi-component in-line thermal break including concentrical arranges, an outer thermally insulating body, an elongated axial insert incorporating integrated pipe fittings, and a thermally non-conductive fluid channel tube set within the elongated axial insert.

20 Claims, 4 Drawing Sheets

(56) References Cited

U.S. PATENT DOCUMENTS

| | | |
|---|---|---|
| 2011/0277563 A1 | 11/2011 | Scott et al. |
| 2012/0110931 A1 | 5/2012 | Eiffert et al. |
| 2012/0292476 A1 | 11/2012 | Smith et al. |
| 2012/0325694 A1 | 12/2012 | Thompson |
| 2013/0312542 A1 | 11/2013 | Rolston |
| 2014/0144254 A1 | 5/2014 | Thompson |
| 2014/0218049 A1 | 8/2014 | Sawamoto et al. |
| 2014/0260695 A1 | 9/2014 | Thompson et al. |
| 2014/0263376 A1* | 9/2014 | Rolston .................. F17C 13/00 220/694 |
| 2017/0082524 A1 | 3/2017 | Curtis |
| 2017/0122848 A1* | 5/2017 | Rolston ................ G01N 1/2202 |

\* cited by examiner

IN-LINE THERMAL BREAK

BACKGROUND

Sample line temperature control is a known problem in the field of gas sample conditioning, particularly with respect to cryogenic liquids such as LNG. Heat generated from gas separation or vaporization process(es) can migrate into the feed line or source channel of a gas sample conditioning system, leading to anomalous sample analysis, heat leakage, condensation, icing, freezing, and/or other undesirable effects.

In-line gas sample vaporization technology provides vaporized gas samples for composition and energy content analysis. Minimization of heat migration prior to introduction of a liquid sample to a vaporizer is desired in in-line systems to maintain specific temperature, pressure and velocity conditions in order to avoid pre-vaporization and its adverse effect on accurate sample analysis.

To achieve effective in-line thermal isolation, in addition to providing an effective thermal insulation capacity to prevent heat migration, an isolator construct needs to exhibit sufficient burst resistance, thermal stress resistance, and complete mechanical sealing even at cryogenic temperatures to avoid leakage and failure.

One such construct is disclosed in U.S. Pat. No. 10,107,722 B2 to Rolston. Rolston discloses an in-line thermal isolator disposed proximate to an entry port of a sample vaporizer to minimize heat migration from a sample vaporizer to an upstream sample conduit, the isolator featuring an elongated, generally cylindrical body incorporating an axial bore for accommodating fluid flow from a sample source, and a fitting member adapted for in-line sealable connection with a mating member formed in the sample conduit.

SUMMARY OF THE INVENTION

It is an object of the present invention to provide an improved adjunct to minimize heat migration from a sample vaporizer to a liquid sample input conduit.

It is another object of the present invention to enhance control over sample fluid flow by preventing pre-vaporization, maintain desired liquid sample volume passthrough, possess sufficient burst resistance, and provide for secure mechanical, leak-proof connection notwithstanding exposure to a significant temperature gradient.

These and other objects are satisfied by an embodiment of the invention characterized by one solution to address current limitations, based on at least one embodiment of the invention, of an in-line thermal break comprising: a thermal insulating outer shell body of a first select length having a first end and a second end respectively defining an inlet end face and an outlet end face, said outer shell body including an axial bore extending between the first and second ends of a select cross-sectional dimension, said shell body being composed of a material minimizing heat energy transfer between said first and second ends; an elongated insert member of a second select length greater than the first select length having an outer cross-sectional configuration corresponding to the select cross-sectional dimension of the outer shell body, said elongated insert member defining an inlet incorporating an integrally formed pipe fitting element and an outlet incorporating an integrally formed pipe fitting element, wherein said elongated insert member is disposed in said axial bore of the outer shell body and projects respectively from the first end and second end of the outer shell body, said elongated insert member including an axially disposed bore of a third select length, less than the second select length extending between the pipe fitting elements of the inlet and outlet ends, an integrally formed internal, radially-depending stop collar defining a select depth in said elongated insert member axially disposed bore proximate to the outlet pipe fitting and an exteriorly disposed annulus proximally located to overlie the radially depending stop collar for securing a removable ring for retaining the elongated insert member to the outlet end face of the outer shell body; a fluid channel liner tube having an inlet end and an outlet end of select cross-sectional configuration defining an outer surface corresponding to the elongated insert member axially disposed bore and a thickness substantially equal to the select depth of the radially-depending stop collar wherein the outlet end is seated against the stop collar to provide a fluid channel of substantially constant diameter, the fluid channel liner tube having a fourth axial length less than that of said third axial length, wherein said fluid channel liner tube is composed of a material that is burst resistant and minimizes heat energy transfer; a retaining sleeve ring corresponding to the fluid channel diameter and of a length corresponding to the difference between said third and fourth axial lengths, said retaining sleeve ring being composed of a material possessing a coefficient of expansion similar to that of the elongated insert member to remain seated in the elongated insert member axially disposed bore during thermal changes and securely retain the fluid channel liner tube within the elongated insert member.

The invention provides a second embodiment to the first embodiment further characterized by a radial exteriorly projecting flange adapted to seat against the inlet end face of the outer shell body wherein the flange is integrated with the elongated insert member.

The invention provides a third embodiment to the first embodiment further characterized by the insert member having an integrated radial exteriorly projecting flange adapted to seat against the inlet end face of the outer shell body wherein the flange is integrated with the elongated insert member, wherein said flange and retaining ring fastener formed from stainless steel.

The invention provides a fourth embodiment to the first embodiment further characterized by the outer shell body composed of a material selected from the group consisting of calcium silicate ceramics and composites.

The invention provides a fifth embodiment to the first embodiment further characterized by the outer shell body being a single unitary body.

The invention provides a further embodiment to the first embodiment further characterized by the elongated flange tube formed from stainless steel.

The invention provides a further embodiment to the first embodiment further characterized by the integrally formed pipe fitting element of the inlet being interiorly tapered and matingly sealable to establish a fluid tight seal when engaged with a liquid sample input conduit.

The invention provides a further embodiment characterized by the inlet end face of the outer shell body including a receiving recess and the flange being dimensioned to seat within the receiving recess of the outer shell body.

The invention provides a further embodiment to the first embodiment characterized by the retaining sleeve ring being a three-dimensional O-ring, said O-ring positionally securing the fluid channel liner tube by forming a press fit within said elongated insert member axially disposed bore with a length corresponding to the difference between said third and fourth axial lengths.

The invention provides a further embodiment characterized by the washer being formed from stainless steel.

The invention provides a further embodiment to the first embodiment further characterized by the thermal insulation fluid tube being composed of a material selected from the group consisting of calcium silicate ceramics and composites.

The invention provides a further embodiment to the first embodiment further characterized by a three-dimensional O-ring having a first planar front end and second planar back end formed from stainless steel.

The invention provides a further embodiment to the first embodiment further characterized by the three-dimensional O-ring having a substantially similar coefficient of expansion to said elongated, collared, and flanged insert member.

The invention provides a further embodiment to the first embodiment further characterized by the retaining ring fastener formed from stainless steel.

The invention provides a further embodiment to the first embodiment further characterized by the first inlet end and/or second outlet end of the elongate flange tube. being tapered.

In still another embodiment of the invention, it provides an in-line thermal break comprising concentrically disposed arranges including a thermal insulating body of a select length and having a first end and a second end, the thermal insulating body including an axial bore of a select cross-sectional dimension extending therethrough from first end to second end, the first end including a first receiving recess of a first select depth and a select geometric cross-section and the second end including a receiving recess of a second select depth and a select geometric cross-section, the thermal insulating body composed of a material preventing heat energy transfer between said first and second ends; an elongate flange tube disposed in the thermal insulating body and having a select cross-sectional configuration corresponding to the axial bore a length defining a first inlet end and a second outlet end, the first inlet end including a first element of a mating sealable engaging member cooperatable with a second element of the mating sealable engaging member for establishing a fluid tight seal when engaged with the second element, the first inlet end including an integrated flange dimensioned to seat within the first receiving recess of the thermal insulating body, the second outlet end including an exterior retaining ring annulus co-planarly disposed with the second end of the thermal insulating body, the second outlet end featuring a first element of a mating sealable engaging member cooperatable with a second element of the mating sealable engaging member for establishing a fluid tight seal when engaged with the second element; the elongate flange tube further including a stepped bore of a select cross-sectional dimension extending from a base of said insert end to a base of said outlet end; a thermal insulation fluid tube disposed in said elongate flange tube and having a select cross-sectional configuration corresponding to the stepped bore a length defining a first inlet end and a second outlet end, the thermal insulation fluid tube extending substantially the length of said stepped bore, the thermal insulation fluid tube machined to be received and securely seated on said elongate flange, inlet base and outlet base, and the thermal insulation fluid tube having an internal diameter sufficient to permit flow; a retaining cap dimensioned to be received within the receiving of said elongate flange tube inlet base, the retaining cap forming a press fit with said thermal insulation fluid tube within said stepped bore; and a retaining ring fastener dimensioned to conform to and lockingly engage with the retaining ring annulus to positionally secure and retain said thermal insulation fluid tube.

In a final recited embodiment, the invention contemplates the method of using the above-mentioned thermal breaks to minimize in-line thermal energy migration.

Desirably, the function of a thermal insulating construct according to one embodiment of the invention is to provide for an in-line thermal insulating capability to minimize and/or eliminate altogether heat transfer from a sample takeoff line tubing conveying, for example, cryogenic Liquid Natural Gas to a sample vaporizer, even where individual components may have some degree of thermal communication with one another.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, "analyte sample" contemplates a sample taken from a source such as natural gas, a Liquid Natural Gas, noncryogenic Natural Gas Liquid, or a cryogenic liquid capable of vaporization capable of constituent and/or energy content characterization by conventional analysis equipment such as a gas chromatograph, mass spectrograph, Raman spectrophotometer, tunable diode laser spectrograph, etc.

As used herein, the terms "comprises," "comprising," "includes," "including," "has," "having" or any other variation thereof, are intended to cover a non-exclusive inclusion. For example, a process, method, article, or apparatus that comprises a list of features is necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

As used herein "substantially," "generally," and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to the accompanying drawings which are provided for illustration purposes as representative of a specific exemplary embodiment in which the invention may be practiced. The following illustrated embodiment is described in sufficient detail to enable those skilled in the art to practice the invention. It is to be understood that other embodiments may be utilized and that structural changes based on presently known structural and/or functional equivalents may be made without departing from the scope of the invention.

DETAILED DESCRIPTION

Figure 1:
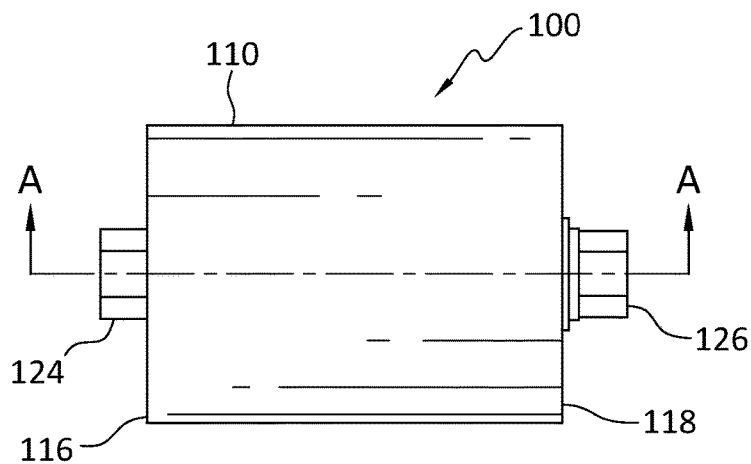
FIG. 1 is a side view of a first embodiment of the invention.
Figure 1:
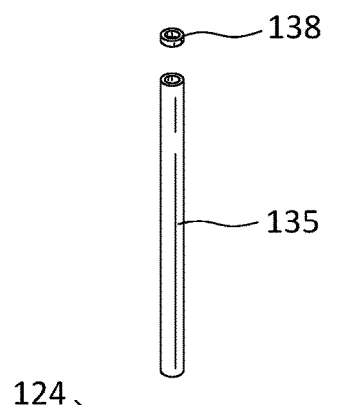

FIGS. 1-6 depict a thermal break construct 100 contemplated by an embodiment of the invention. Thermal break 100 includes concentrically disposed arranges: 1) a thermal insulating outer shell body 110, 2) an elongated insert member 120 incorporating integrated pipe fitting elements at the input and output ends with a collared axial bore extending therebetween, where the insert member 120 is substantially telescopically seated within and projecting from both ends of the insulating shell body 110, and 3) an interior, hydraulic pressure burst resistant fluid liner tube 135 having an outer peripheral surface corresponding to the diameter of the axial bore of the insert member 120 to be concentrically disposed therein with a length less than that the axial bore, and an outer wall with a fluid communication channel dimensionally corresponding to the internal collar of the insert member 120 so as to snuggly seat within and abut and dimensionally correspond to the thickness of the collar of the axial bore to provide a constant diameter fluid channel extending between the pipe fittings.

In more detail, the thermal insulating shell body 110 defines the outer shell of the thermal break 100 and features a central, axially oriented bore 112 and input end face 116 and output end face 118. In one embodiment, each of the end faces 116 and 118 respectively features recesses 115 and 117 of a select geometric shape and having a depth corresponding to the thickness of the insert flanges described below. Preferably, the insulating shell body 110 is fabricated from highly adiabatic, insulating material, such as calcium silicate but may alternatively be composed of materials selected from a group such as ceramics, composites, or any other suitable material so long as it possesses properties of thermal stability, burst resistance, and fluid impenetrability while providing for precision molding/machining/printing into the desired engineered configuration.

Figure 9:
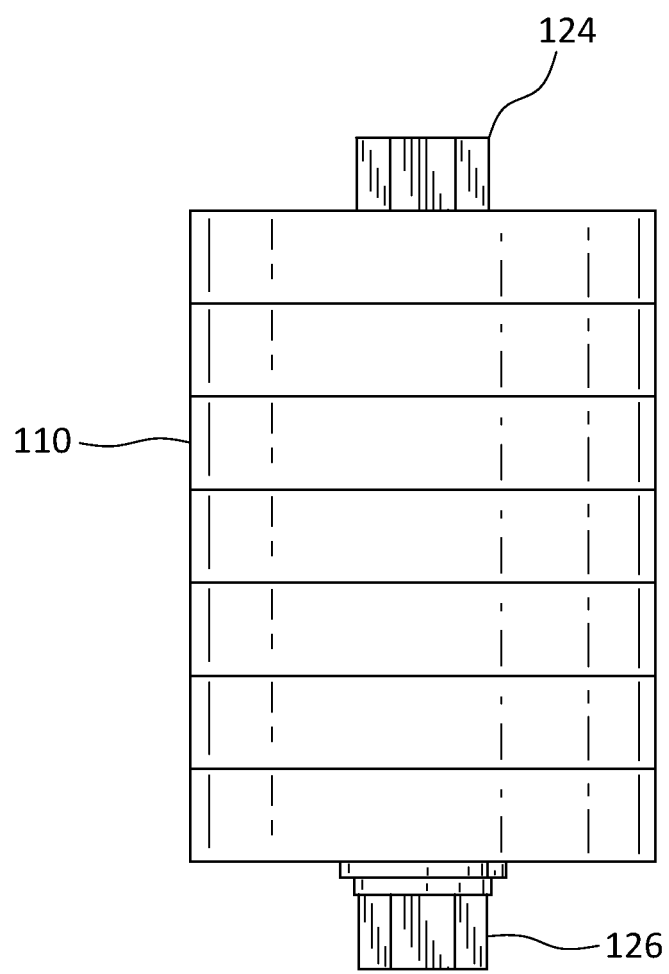
FIG. 9 is a perspective view of an insert according to a second embodiment of the invention.

In the illustrated embodiment of FIG. 1, shell body 110 is a continuous solid. Alternatively, the shell body may be formed by stacking and fusing dimensionally identical rings as illustrated in FIG. 9. The illustrated body depicted in FIG. 4 features, seven laminated rings, each having a thickness of 1.27 cm (0.5 inch), are fused to form an 8.9 cm (3.5-inch) long body. Alternatively, shell body 110 may be formed by fusing a plurality of discrete layers of similarly dimensioned cross-section rings of a selected geometry, e.g., polygonal, ovate, of differing depths and or composition exhibiting similar or differential degrees of thermal conductivity.

Figure 7:
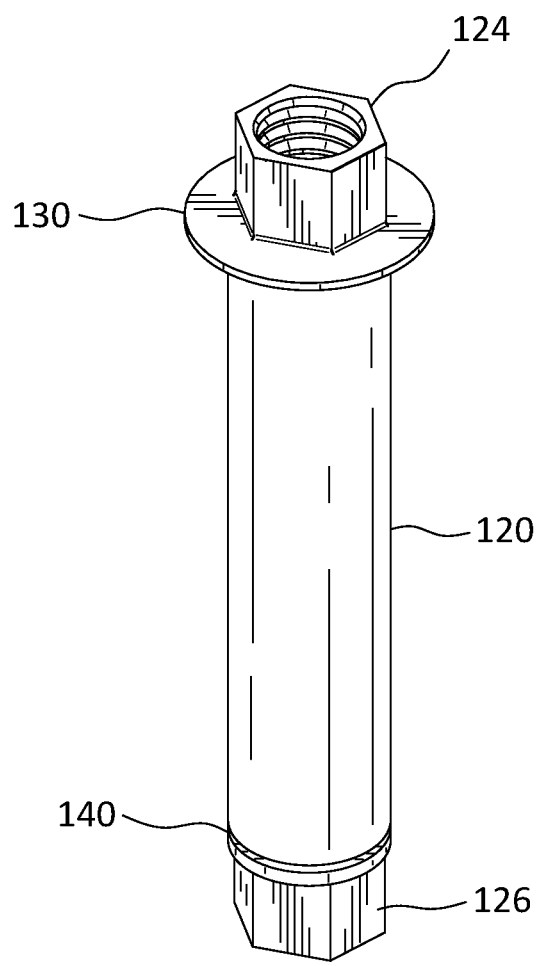
FIG. 7 is a perspective view of the insert of the first embodiment of FIG. 1.
Figure 8:
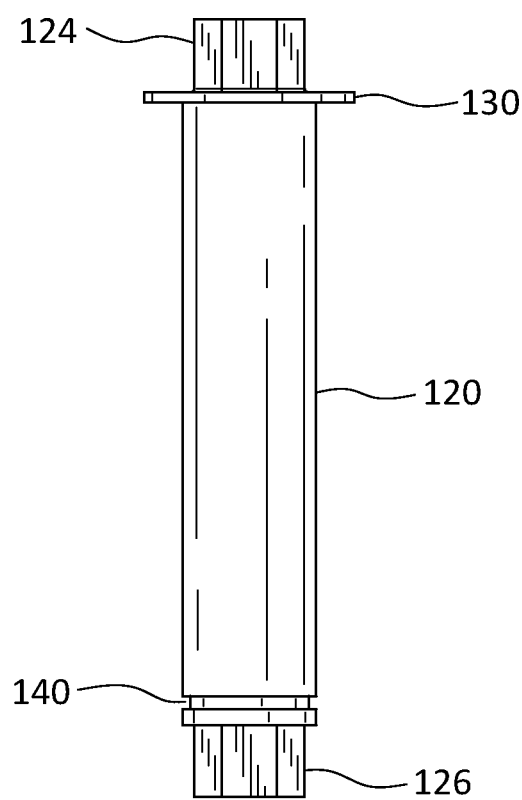
FIG. 8 is a side view of the insert of the first embodiment of FIG. 1.

The elongated collared and flanged insert member 120, illustrated independently in FIGS. 7 and 8, defines a first end and a second end referenced as the proximal, inlet end and the distal outlet end, and is cross-sectionally sized to correspond to and seat within bore 112 of the outer shell body 110 and to project beyond both end faces thereof. The insert member 120 is preferably comprised of 316 stainless steel or another substantially rigid, burst resistant, low thermally conductive, material. The proximal inlet end of the insert member 120 features an integrally formed, projecting, inlet pipe fitting element 124 and the distal outlet end features a corresponding outlet pipe fitting element 126. By way of example, the pipe fitting elements comprise interiorly-tapered, NPT-type female fitting members with 0.63 cm (¼ inch) threading. to provide a first cooperating member of sealing joint connection with inlet and outlet tubes respectively. The outer surfaces around the pipe fitting elements 126 and 128 preferably provide a tool compatible surface such as the illustrated hexagonal exterior surfaces to permit the use of conventional tooling, i.e., a wrench for installation or removal.

The interior of the insert member 120 defines an axial, stepped bore 122 extending from the proximal inlet end to the distal outlet end to establish a fluid channel extending between the inlet from inlet pipe fitting element 124 to outlet pipe fitting element 126. The internal diameter of the bore 122 features a radial inwardly projecting collar/shoulder 125 located proximate to the outlet pipe fitting element 126 and within the bore 112 of the insulating body 110.

The exterior of the insert member 120 features an integrated flange 130 disposed about and extending radially outwardly from the insert member 120 distally of the proximal inlet pipe fitting element 124. Preferably, the flange 130 dimensionally correspond to and is received within the recess 115 in the inlet face 116 of the insulating body 110. As depicted in the illustrated embodiment, the flange 130 preferably has a depth substantially corresponding to that of the recess 115.

Figure 2:
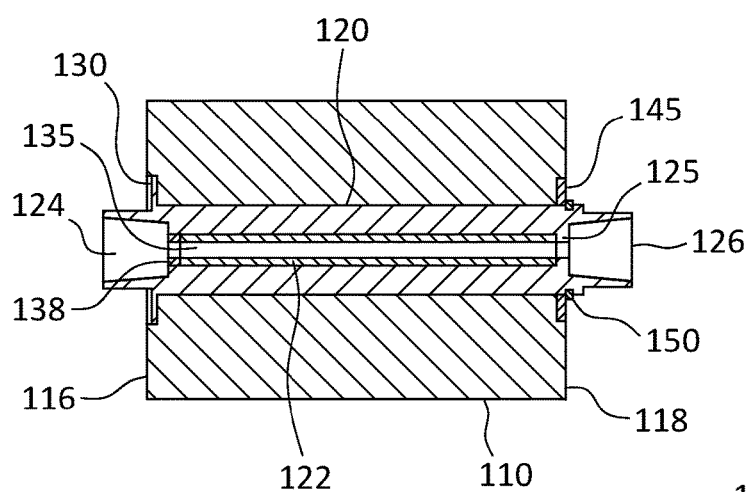
FIG. 2 is a cutaway side view of the embodiment of FIG. 1.
Figure 2:
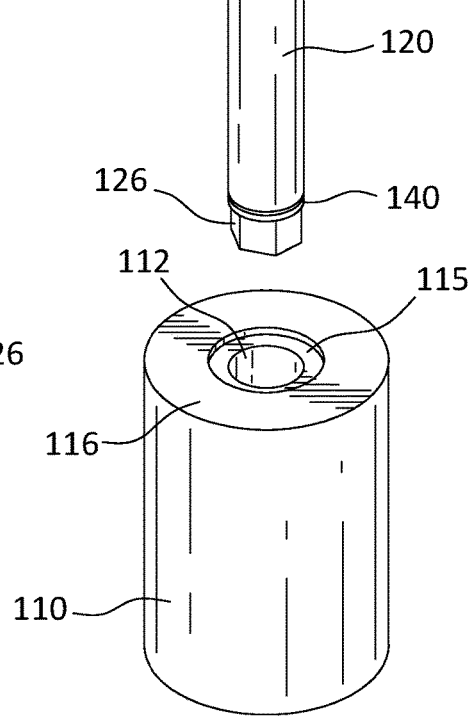
Figure 3:
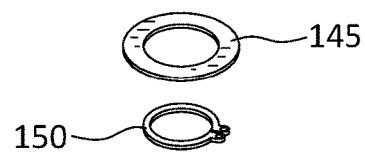
FIG. 3 is an exploded side perspective view of the embodiment of FIG. 1.
Figure 4:
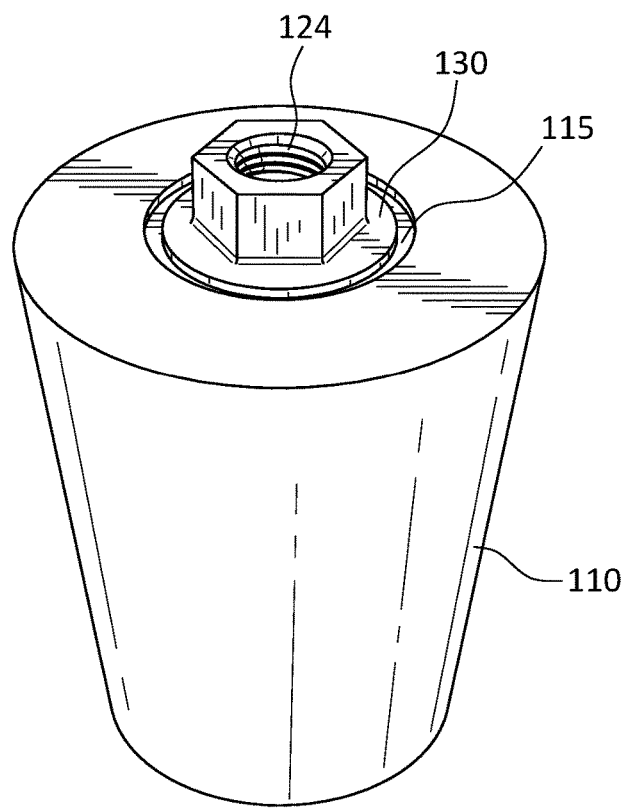
FIG. 4 is a side perspective end view of the embodiment of FIG. 1.
Figure 5:
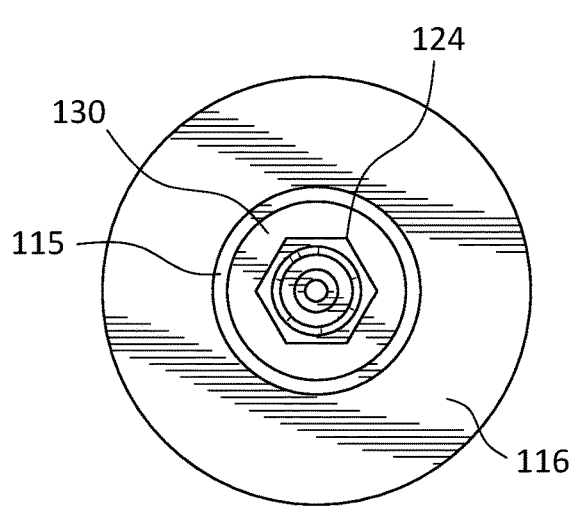
FIG. 5 is an end view of the embodiment of FIG. 1.
Figure 6:
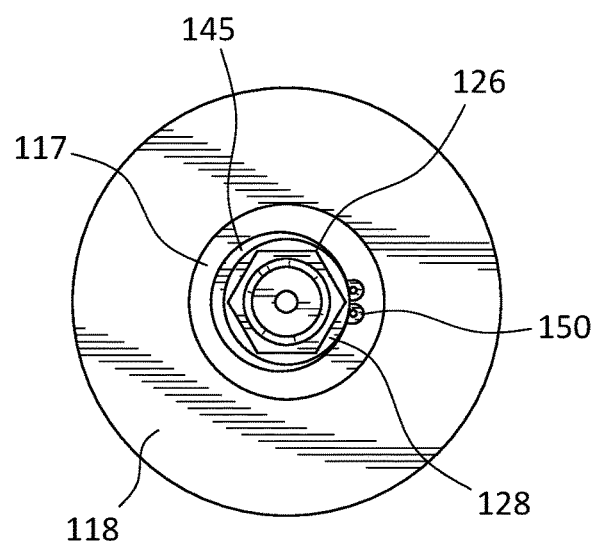
FIG. 6 is an opposite end view of the embodiment of FIG. 1.

Proximate to the outlet pipe fitting 126, the exterior surface of the insert member 120 includes a retaining ring annulus 140 axially positioned to substantially overlie the interior collar/shoulder 124 and align with the distal face 118 of the insulating body. As illustrated in FIG. 2, the retaining ring annulus 140 is configured to positionally secure a washer 145 in the outlet recess 117 with a retaining ring fastener 150.

Turning to the fluid channel liner tube 135, it is seated concentrically within the bore 122 and is composed of a material that is burst resistant to hydraulic pressure and thermally non-conductive. The fluid channel liner tube 135 defines a uniformly sized fluid channel with an interior diameter substantially identical to that of the depth of the collar/shoulder 125 and an outer diameter corresponding to the diameter of the bore 122. The fluid channel liner tube preferably is friction/press fit in the insert bore 122 so as to abut the collar/shoulder 125 at the distal outlet end. In the illustrated embodiment, the proximal inlet end of the channel tube liner 135 is secured by a press fit retaining sleeve ring 138 possessing a substantially identical diameter and thickness of the fluid channel tube 135 to result in a combined axial length substantially coextensive with the bore 122. The fluid insert tube 135 is thereby securely seated in the bore 122 and provides an uninterrupted fluid channel of substantially uniform cross-section from the inlet fitting 124 to the outlet fitting 126.

In the illustrated embodiment, the fluid channel liner tube 135 is composed of a thermally insulative material such as a mullite or zirconia ceramic, for example. Alternatively, the fluid channel liner tube 135 may be composed of other suitable nonreactive, burst resistant materials that exhibit heat transfer abatement to surrounding components.

In the illustrated embodiment, the press fit retaining sleeve ring 138 is constructed from stainless steel or any other generally thermally insulative material possessing substantially the same coefficient of thermal expansion with insert member 120. As such, the sleeve ring 138 will shrink or expand at substantially the same rate as the insert member 120 thereby maintaining the tight interference fit of the sleeve ring 138 within bore 122.

Preferable, for placement of thermal break 100 according to the invention, the break 100 is located in line atop an analyte sample vaporizer in a static environment, where the inlet pipe fitting element 124 faces upwardly and the outlet element faces downwardly for connection to the underlying vaporizer unit.

In the illustrated embodiment, insert member 120 defines a bored, continuous flanged cylindrical shaft. However, it should be appreciated that the elongated flanged insert member 120 may be of any desired tubular cross-sectional shape, e.g., polygonal. Also, rather than featuring an integrated flange at the inlet end, both ends of insert member 120 may include the washer/retaining ring fastening construct on both the inlet and outlet ends.

It should be understood that the invention is not limited to the specific embodiments disclosed herein, and that many modifications and other embodiments of the invention are intended to be included within the scope of the invention. Moreover, although specific terms are employed herein, they are used only in a generic and descriptive sense, and not for the purposes of limiting the description invention.

What is claimed is:

1. An in-line thermal break comprising:
   a thermal insulating outer shell body of a first select length having a first end and a second end respectively defining an inlet end face and an outlet end face, said outer shell body including an axial bore extending between the first and second ends of a select cross-sectional dimension, said shell body being composed of a material minimizing heat energy transfer between said first and second ends;
   an elongated insert member of a second select length greater than the first select length having an outer cross-sectional configuration corresponding to the select cross-sectional dimension of the outer shell body, said elongated insert member defining an inlet incorporating an integrally formed pipe fitting element and an outlet incorporating an integrally formed pipe fitting element, wherein said elongated insert member is disposed in said axial bore of the outer shell body and projects respectively from the first end and second end of the outer shell body, said elongated insert member including an axially disposed bore of a third select length, less than the second select length extending between the pipe fitting elements of the inlet and outlet ends, an integrally formed internal, radially-depending stop collar defining a select depth in said elongated insert member axially disposed bore proximate to the outlet pipe fitting and an exteriorly disposed annulus proximally located to overlie the radially-depending stop collar for securing a removable ring for retaining the elongated insert member to the outlet end face of the outer shell body;
   a fluid channel liner tube having an inlet end and an outlet end of select cross-sectional configuration defining an outer surface corresponding to the elongated insert member axially disposed bore and a thickness substantially equal to the select depth of the radially-depending stop collar wherein the outlet end is seated against the stop collar to provide a fluid channel of substantially constant diameter, the fluid channel liner tube having a fourth axial length less than that of said third select length, wherein said fluid channel liner tube is composed of a material that is burst resistant and minimizes heat energy transfer;
   a retaining sleeve ring corresponding to the fluid channel diameter and of a length corresponding to the difference between said third select and fourth axial lengths, said retaining sleeve ring being composed of a material possessing a coefficient of expansion similar to that of the elongated insert member to remain seated in the elongated insert member axially disposed bore during thermal changes and securely retain the fluid channel liner tube within the elongated insert member.

2. The in-line gas thermal break of claim 1 further comprising a radial exteriorly projecting flange adapted to seat against the inlet end face of the outer shell body wherein the flange is integrated with the elongated insert member.

3. The in-line gas thermal break of claim 2 wherein the flange and retaining ring sleeve are formed from stainless steel.

4. The in-line gas thermal break of claim 1 wherein the outer shell body is composed of a material selected from the group consisting of calcium silicate ceramics and composites.

5. The in-line gas thermal break of claim 4 wherein the outer shell body is a single unitary body.

6. The in-line gas thermal break of claim 1 wherein the integrally formed pipe fitting element of the inlet is interiorly tapered and matingly sealable to establish a fluid tight seal when engaged with a liquid sample input conduit.

7. The in-line gas thermal break of claim 2 wherein the inlet end face of the outer shell body includes a receiving recess and the flange is dimensioned to seat within the receiving recess of the outer shell body.

8. The in-line gas thermal break of claim 1 wherein the retaining sleeve ring is a three-dimensional O-ring, said O-ring positionally securing the fluid channel liner tube by forming a press fit within said elongated insert member axially disposed bore with a length corresponding to the difference between said third and fourth axial lengths.

9. The in-line gas thermal break of claim 1 further comprising a washer dimensioned to further secure the retaining sleeve ring in the elongated insert member axiallly disposed bore and securely retain the fluid channel liner tube within the elongated insert member.

10. The in-line gas thermal break of claim 1 wherein the washer is formed from stainless steel.

11. The in-line gas thermal break of claim 1 wherein the fluid channel liner tube is composed of a material selected from the group consisting of calcium silicate ceramics and composites.

12. An in-line thermal break comprising:
    a thermal insulating body of a select length and having a first end and a second end, said thermal insulating body including an axial bore of a select cross-sectional dimension extending therethrough from first end to second end;
    said first end including a first receiving recess of a first select depth and a select geometric cross-section and said second end including a receiving recess of a second select depth and a select geometric cross-section;
    said thermal insulating body composed of a material preventing heat energy transfer between said first and second ends;

a rigid elongate flange tube disposed in said thermal insulating body and having a select cross-sectional configuration corresponding to the axial bore a length defining a first inlet end and a second outlet end;
   said first inlet end including a first element of a mating sealable engaging member cooperatable with a second element of the mating sealable engaging member for establishing a fluid tight seal when engaged with the second element;
   said first inlet end including an integrated flange dimensioned to seat within the first receiving recess of the thermal insulating body,
   said second outlet end including an exterior retaining ring annulus co-planarly disposed with the second end of the thermal insulating body,
   said second outlet end featuring a first element of a mating sealable engaging member cooperatable with a second element of the mating sealable engaging member for establishing a fluid tight seal when engaged with the second element;
   said elongate flange tube further including a stepped bore of a select cross-sectional dimension extending from a base of said insert end to a base of said outlet end;
a thermal insulation fluid tube disposed in said elongate flange tube and having a select cross-sectional configuration corresponding to the stepped bore a length defining a first inlet end and a second outlet end,
   said thermal insulation fluid tube extending substantially the length of said stepped bore;
   said thermal insulation fluid tube machined to be received and securely seated on said elongate flange tube inlet base and outlet base;
   said thermal insulation fluid tube having an internal diameter sufficient to permit fluid flow; and
   said thermal insulation fluid tube composed of a material preventing heat energy transfer between said first inlet end and second inlet end;
a retaining cap dimensioned to be received within the receiving recess of said elongate flange tube inlet base,
   said retaining cap forming a press fit with said thermal insulation fluid tube within said stepped bore; and
a retaining ring dimensioned to conform to and lockingly engage with the retaining ring annulus to positionally secure and retain said thermal insulation fluid tube.

13. The in-line gas thermal break of claim 12, wherein said thermal insulating body is calcium silicate.

14. The in-line gas thermal break of claim 12, wherein said thermal insulating body is a single unitary body.

15. The in-line gas thermal break of claim 12, wherein said elongate flange tube is stainless steel.

16. The in-line gas thermal break of claim 12, wherein said integrated flange is stainless steel.

17. The in-line gas thermal break of claim 12, wherein said thermal insulation fluid tube is ceramic.

18. The in-line gas thermal break of claim 12, wherein said retaining cap and said elongate flange tube have substantially identical coefficients of expansion.

19. The method of preventing in-line migration of thermal energy by installing an in-line thermal break according to claim 1.

20. The method of preventing in-line migration of thermal energy by installing an in-line thermal break according to claim 12.

\* \* \* \* \*